United States Patent
Sato et al.

[11] Patent Number: 6,070,112
[45] Date of Patent: May 30, 2000

[54] VEHICLE STEERING CONTROL APPARATUS

[75] Inventors: Kunihito Sato, Mishima; Takeshi Goto, Toyota; Yuichi Kubota, Susono, all of Japan

[73] Assignee: Toyota Jidosha Kabushiki Kaisha, Japan

[21] Appl. No.: 08/969,471

[22] Filed: Nov. 13, 1997

[30] Foreign Application Priority Data

Nov. 14, 1996 [JP] Japan ................................... 8-303337

[51] Int. Cl.[7] ................................................ B62D 6/00
[52] U.S. Cl. ........................... 701/41; 701/28; 348/118
[58] Field of Search ....................... 701/41, 28; 348/118, 348/119; 180/168

[56] References Cited

U.S. PATENT DOCUMENTS

| | | | |
|---|---|---|---|
| 5,245,422 | 9/1993 | Borcherts et al. | 348/119 |
| 5,483,453 | 1/1996 | Uemura et al. | 701/23 |
| 5,517,412 | 5/1996 | Unoura | 701/23 |
| 5,610,816 | 3/1997 | Kim | 701/24 |
| 5,765,116 | 6/1998 | Wilson-Jones et al. | 701/41 |

FOREIGN PATENT DOCUMENTS 5-297939  11/1993  Japan .
7-105498   4/1995  Japan .

Primary Examiner—Michael J. Zanelli
Attorney, Agent, or Firm—Finnegan, Henderson, Farabow, Garrett & Dunner, L.L.P.

[57] ABSTRACT

A steering control apparatus for a vehicle which prevents an interference between a steering operation performed by the steering control apparatus and a steering operation performed by a driver of the vehicle. A guide line provided on a vehicle moving lane is recognized by a forward image of the vehicle so as to set a target position on the vehicle moving lane based on a result of recognition of the guide line. A steering control operation is performed so that the vehicle moves to trace the target position. The steering control operation is started when a distance between the vehicle and the guide line is less than a first predetermined value. The steering control operation is ended when a distance between the vehicle and the guide line exceeds a second predetermined value which is greater than the first predetermined value.

5 Claims, 6 Drawing Sheets

F I G. 4
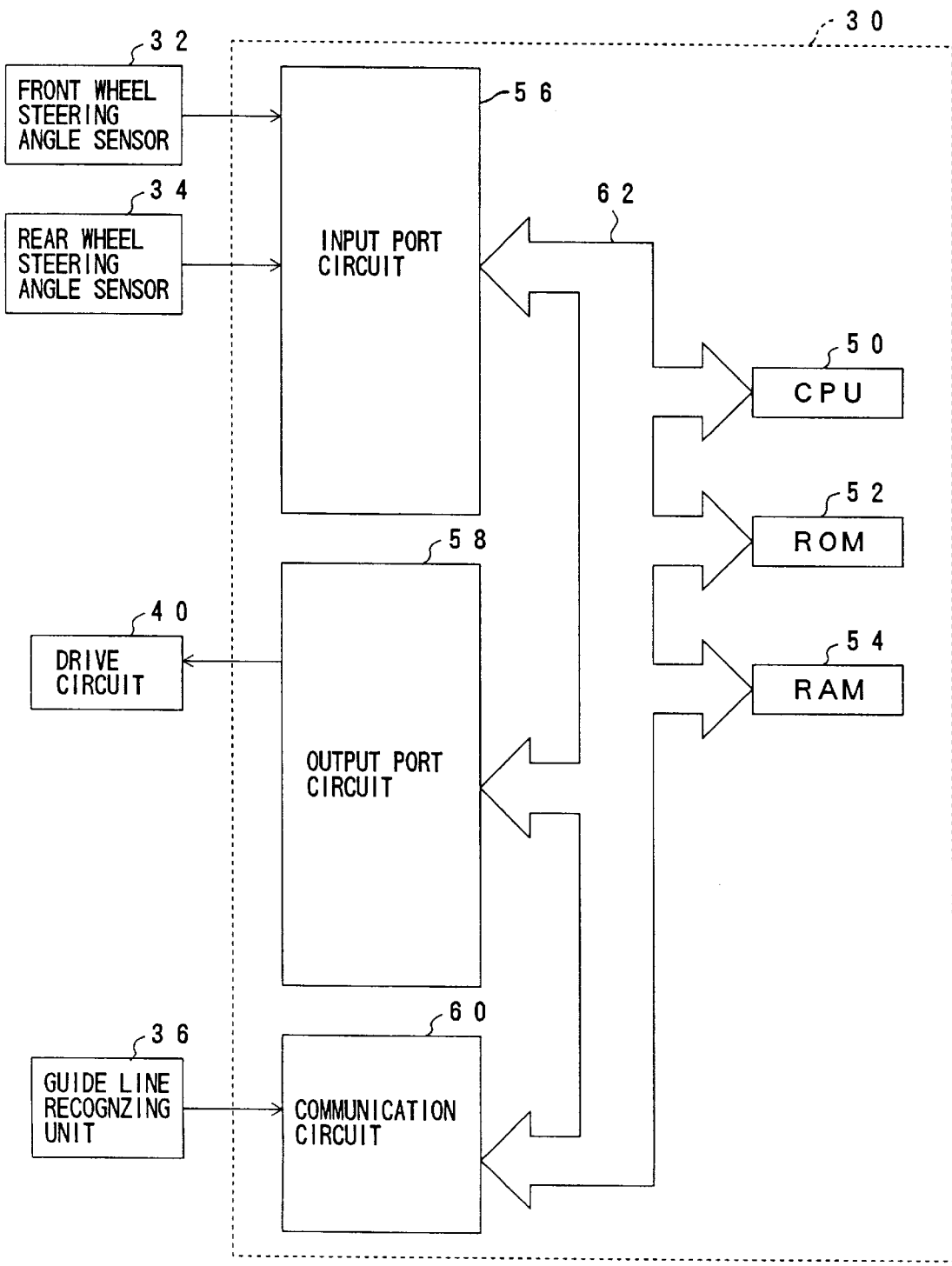

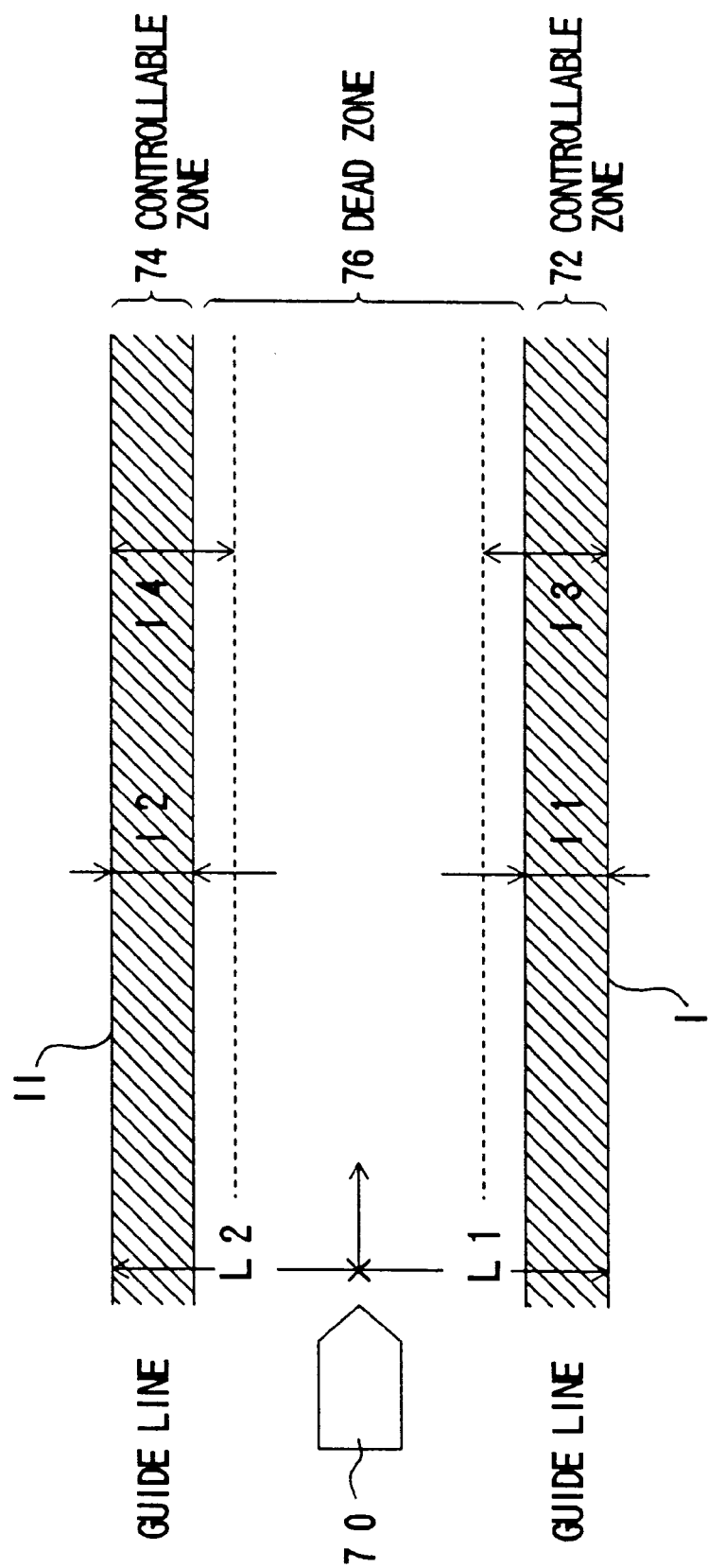

VEHICLE STEERING CONTROL APPARATUS

BACKGROUND OF THE INVENTION

1. Field of the Invention

The present invention relates to a steering control apparatus for a vehicle and, more particularly, to a steering control apparatus for a vehicle which controls a steering operation so that the vehicle moves within a lane by recognizing the lane by a forward image of the vehicle.

2. Description of the Related Art

Conventionally, in order to safely move a vehicle, a vehicle steering control apparatus has been suggested which controls a steering operation by recognizing a guide line such as a white line provided on a road surface so that the vehicle moves along the guide line without turning aside from the guide line.

For example, Japanese Laid-Open Patent Application No. 5-297939 discloses a steering control apparatus which detects a position of the vehicle with respect to guide lines on both sides of a lane on which the vehicle is moving. This steering control apparatus sets a target position along one of the guide lines when a deviation of the position of the vehicle relative to that guide line is detected so as to control a steering operation of the vehicle so that the vehicle traces the target position or target line.

In this steering control apparatus, a steering control is performed by setting the target position to a position along a guide line from which the vehicle turns aside. Accordingly, when a driver of the vehicle turns a steering wheel so as to move the vehicle to an arbitrary position within a lane on which the vehicle is moving, the steering control apparatus controls the vehicle to trace the above-mentioned target position. Thus, there is a problem in that the steering operation of the driver interferes with the steering operation of the steering control apparatus.

SUMMARY OF THE INVENTION

It is a general object of the present invention to provide an improved and useful steering control apparatus for a vehicle in which the above-mentioned problem is eliminated.

A more specific object of the present invention is to provide a steering control apparatus for a vehicle which prevents an interference between a steering operation performed by the steering control apparatus and a steering operation performed by a driver of the vehicle.

In order to achieve the above-mentioned operation, there is provided according to the present invention a steering control apparatus for a vehicle comprising:

guide line recognizing means for recognizing at least one guide line provided on a vehicle moving lane on which the vehicle is moving so as to set a target position on the vehicle moving lane based on a result of recognition of the guide line;

steering control means for performing a steering control operation so that the vehicle moves to trace the target position;

steering control starting means for starting the steering control operation when a distance between the vehicle and the guide line recognized by the guide line recognizing means is less than a first predetermined value; and steering control ending means for ending the steering control operation when the distance between the vehicle and the guide line recognized by the guide line recognizing means exceeds a second predetermined value which is greater than the first predetermined value.

In the above-mentioned invention, referring to FIG. 1 which shows a principle of the present invention, the guide line recognizing means M1 is provided for recognizing a guide line provided on the road surface. A target position on the vehicle moving lane is set based on a result of recognition of the guide line. The steering control means M2 controls a steering operation so that the vehicle moves to trace the target position. The steering control starting means M3 starts the steering operation when a distance between the vehicle and the guide line is less than a first predetermined value. The steering control ending means M4 ends the steering operation when a distance between the vehicle and the guide line exceeds a second predetermined value which is greater than the first predetermined value.

Thus, according to the present invention, the steering control operation is performed only when the vehicle approaches the guide line. That is, the steering control operation is performed only when the vehicle may cross the guide line. Accordingly, the steering control operation is not performed when the vehicle is moving in a dead zone which is an area other than the area defined by the predetermined distance from the guide line. Thus, the steering operation of the driver does not interfere with the steering operation of the steering control apparatus in the dead zone.

In one embodiment of the present invention, the guide line recognizing means may comprises:

a camera which takes an image of a forward view of the vehicle; and a guide line recognizing unit which processes the image taken by the camera so as to recognize the guide line and set the target position, the guide line recognizing unit calculating a distance between the vehicle and the guide line and an amount of offset of a present position of the vehicle from the target position.

Additionally, the steering control means may include:

a steering mechanism operated by an electric motor;

steering calculating means for calculating an amount of steering to be achieved by the steering mechanism in accordance with the offset amount of the vehicle; and a drive circuit which controls the electric motor so that the amount of steering calculated by the steering calculating means is achieved.

In one embodiment according to the present invention, the guide line recognizing means may recognize a first guide line and a second guide line between which the vehicle is moving, the guide line recognizing means calculating a first distance between the vehicle and the first guide line and a second distance between the vehicle and the second guide line. The steering control starting means may start a steering control operation when one of first and second conditions is satisfied, the first distance being equal to or less than a first value in the first condition, the second distance being equal to or less than a second value in the second condition. The steering control ending means may end the steering control operation when one of third and fourth conditions is satisfied, the first distance being greater than a third value in the third condition, the second distance being greater than a fourth value in the fourth condition, the third value being greater than the first value and the fourth value being greater than the second value.

In this invention, the steering control operation is performed only when the vehicle approaches one of the first and second guide lines. That is, the steering control operation is not performed when the vehicle is moving near the center portion between the first and second guide lines.

Other objects, features and advantages of the present invention will become more apparent from the following detailed description when read in conjunction with the accompanying drawings.

BRIEF DESCRIPTION OF THE DRAWINGS

FIG. 4 is a block diagram of an ECU shown in FIG. 2;

FIG. 6 is an illustration for explaining a steering control operation performed in the embodiment of the present invention.

DETAILED DESCRIPTION OF THE PREFERRED EMBODIMENT

Figure 2:
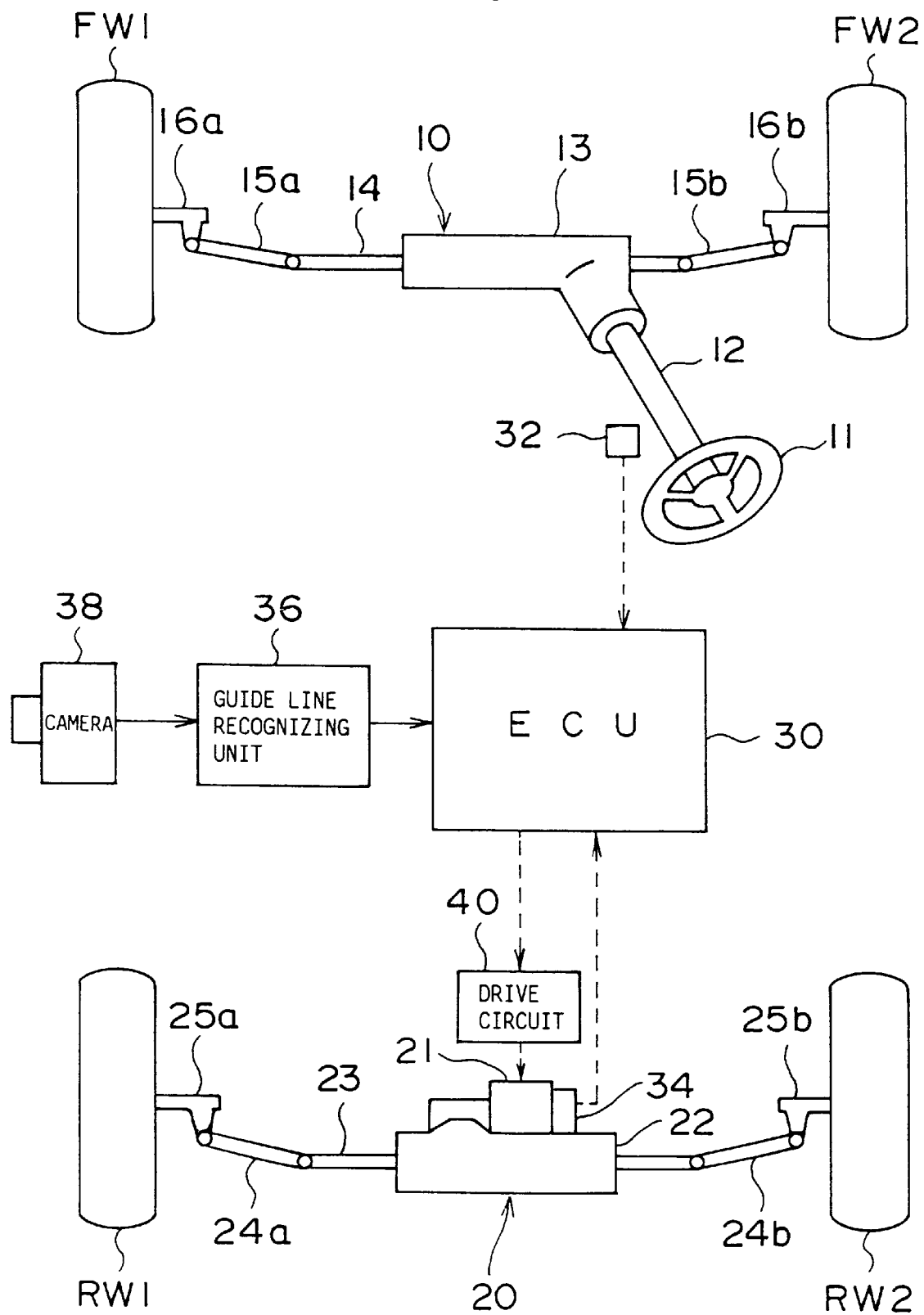
FIG. 2 is an illustration of a structure of a steering control apparatus according to an embodiment of the present invention.

A description will now be given, with reference to FIG. 2, of an embodiment of the present invention. FIG. 2 is an illustration of a structure of a steering control apparatus according to the embodiment of the present invention.

In FIG. 2, a front wheel steering mechanism 10 includes a steering wheel 11 which is connected to a pinion gear (not shown in the figure) provided in a steering gear box 13 via a steering shaft 12. The pinion gear is engaged with a rack bar 14 so as to convert a rotational motion of the steering wheel into a reciprocal motion of the rack bar 14. Opposite ends of the rack bar 14 are connected to left and right front wheels FW1 and FW2 via left and right tie rods 15a and 15b and left and right knuckle arms 16a and 16b, respectively, so that the left and right front wheels FW1 and FW2 are operated by a steering operation of the steering wheel 11.

A rear wheel steering mechanism 20 includes an electric motor 21 such as a brushless motor which serves as an actuator for steering left and right rear wheels RW1 and RW2. A rotational shaft (not shown in the figure) of the electric motor 21 is connected to a relay rod 23 via a reduction mechanism (not shown in the figure) provided in a steering gear box 22. The relay rod 23 is movable in a longitudinal direction thereof. The reduction mechanism is constructed so that the electric motor 21 cannot be operated by a force exerted on the relay rod 23. Opposite ends of the relay rod 23 are connected to the left and right rear wheels RW1 and RW2 via left and right tie rods 24a and 24b and left and right knuckle arms 25a and 25b, respectively, so that the left and right rear wheels RW1 and RW2 are operated by axial movement of the relay rod 23.

A front wheel steering angle sensor 32, a rear wheel steering angle sensor 34 and a guide line recognizing unit 36 are connected to an electronic control unit (ECU) 30. The front wheel steering angle sensor 32 detects a steering angle of the left and right front wheels FW1 and FW2. The rear wheel steering angle sensor 34 detects a steering angle of the left and right rear wheels RW1 and RW2.

The guide line recognizing unit 36, which serves as guide line recognizing means M1, processes an image of the road in front of the vehicle. The image of the road is taken by a camera 38 and supplied to the guide line recognizing unit 36. The guide line recognizing unit 36 detects guide lines provided on the road surface such as a center line, a lane separation line and passing prohibition line by processing the image of the road so as to recognize the lane on which the vehicle is moving based on the detected guide lines.

Figure 3:
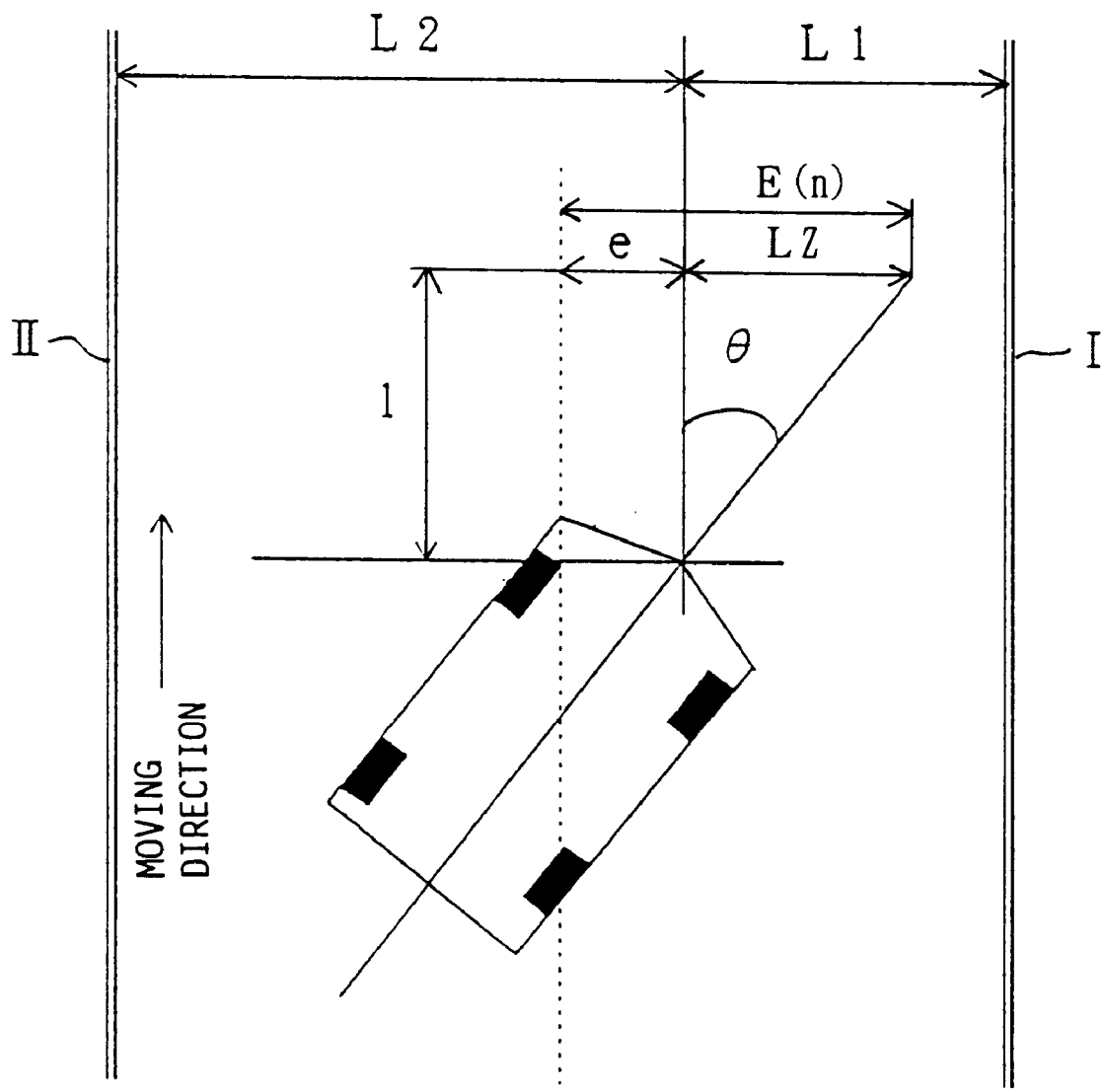
FIG. 3 is an illustration for explaining a relationship between guide lines and a vehicle moving between the guide lines.

FIG. 3 is an illustration for explaining a relationship between guide lines I and II and the vehicle moving between the guide lines. The guide line recognizing unit 36 detects a present offset amount e of the vehicle from the center line (indicated by a dotted line) between the guide lines I and II. The guide line recognizing unit 36 also detects distances from each of the guide lines I and II. In FIG. 3, an angle $\theta$ is an inclination angle of the vehicle with respect to the lane which is obtained from the image of the road. In FIG. 3, $E(n)$ represents an offset amount of a front viewing point from the center of the lane, and LZ represents an offset amount of the front viewing point from the current position of the vehicle. The offset amount $E(n)$ and the offset amount LZ are represented as follows, where 1 (constant value) is a front viewing point distance and e is the offset amount of the vehicle in a transverse direction of the lane.

$$E(n)=e+LZ$$

$$LZ=1\times\theta$$

The offset amount $E(n)$ is supplied to the ECU 30.

FIG. 4 is a block diagram of the ECU 30. As shown in FIG. 4, the ECU 30 has a microcomputer structure, and comprises a central processing unit (CPU) 50, a read only memory (ROM) 52, a random access memory (RAM) 54, an input port circuit 56, an output port circuit 58 and a communication circuit 60, all of which are interconnected by a bidirectional common bus 62.

The input port circuit 56 is provided with detection signals output from the front steering angle sensor 32 and the rear steering angle sensor 34. Additionally, the offset amount $E(n)$ output from the guide line recognizing unit 36 is supplied to the communication circuit 60.

The ROM 52 stores control programs. The CPU 50 performs various calculations in accordance with the control programs by using the RAM 54 which serves as a working area. Control signals are produced by calculations performed by the CPU 50, and the control signals are supplied to a drive circuit 40 via the output port circuit 58. The drive circuit 40 drives the electric motor 21 so as to steer the rear wheels RW1 and RW2.

Figure 1:
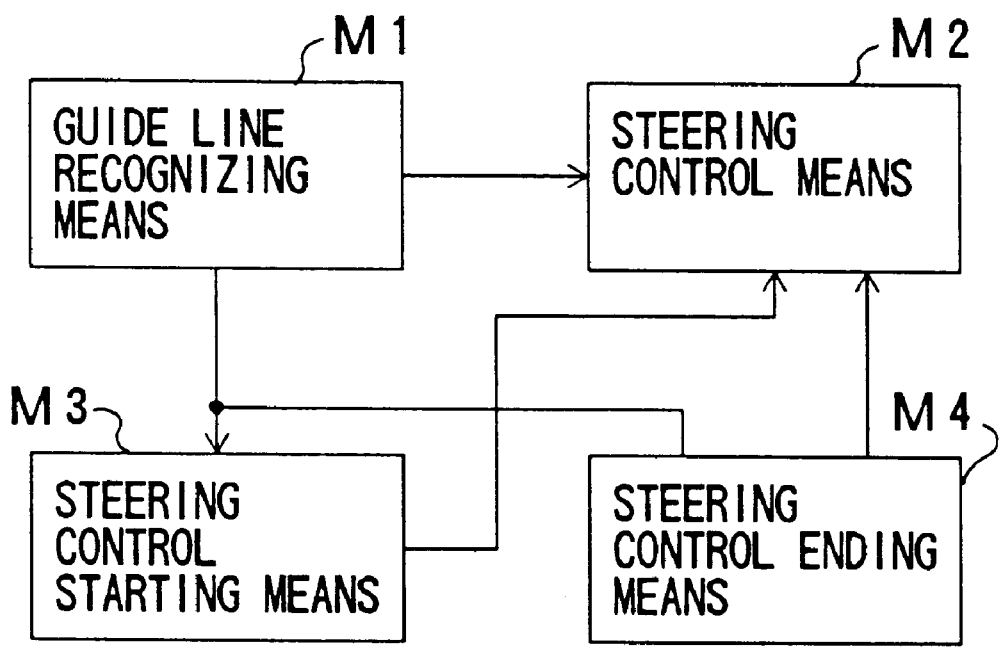
FIG. 1 is an illustration for explaining a principle of the present invention.
Figure 5:
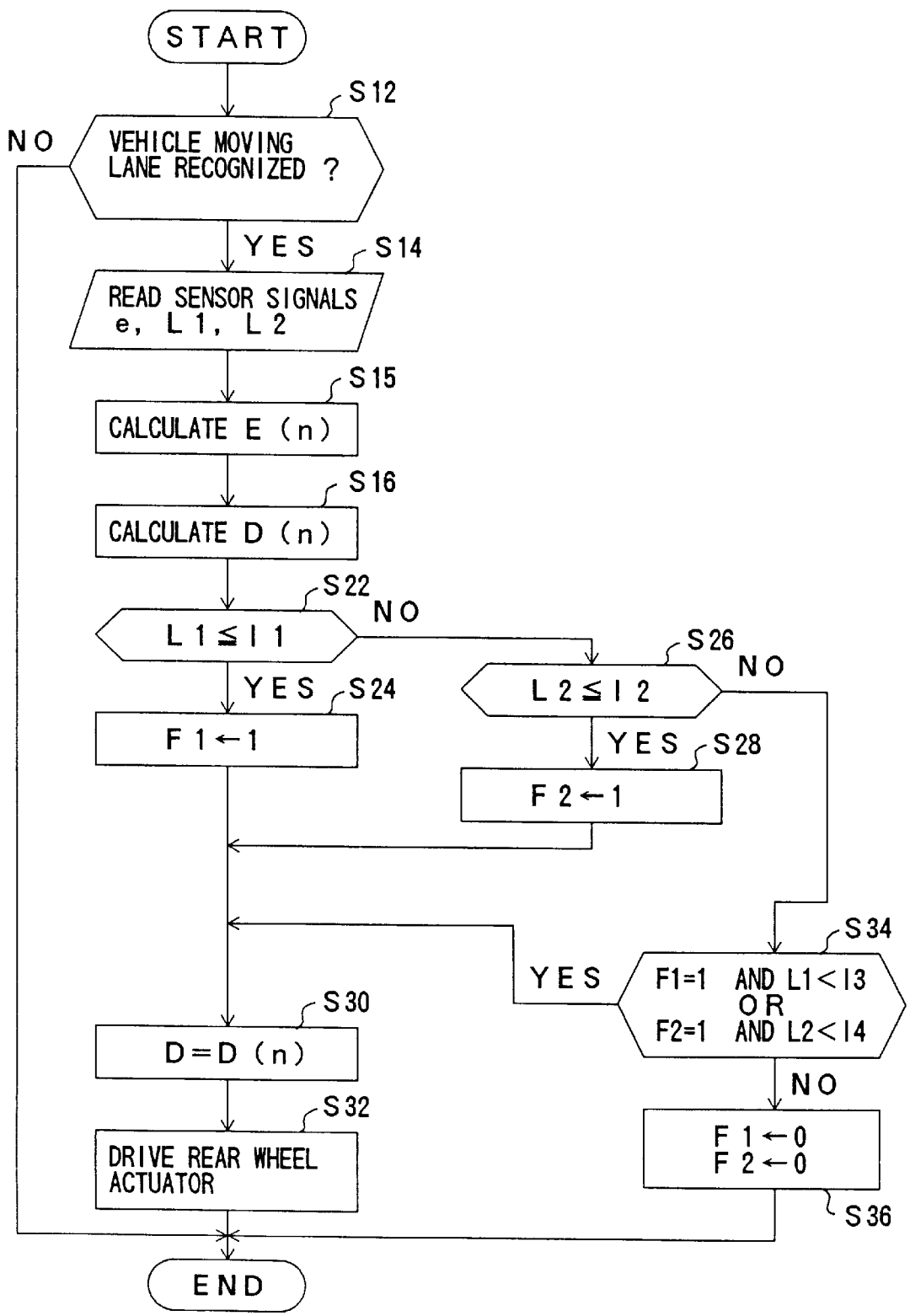
FIG. 5 is a flowchart of a steering control operation performed by a CPU shown in FIG. 4.

FIG. 5 is a flowchart of a steering control operation performed by the CPU 30. This steering control operation corresponds to the steering control means M2 shown in FIG. 1. The steering control operation is repeated at a predetermined time interval. A description will now be given, with reference to FIG. 6, of the steering control operation. In FIG. 6, a vehicle 70 is moving on a lane defined by guide lines I and II. The center of the vehicle 70 is away from the guide line I by a distance L1, and the center of the vehicle 70 is away from the guide line II by a distance L2.

Referring to FIG. 5, when power is turned on, flags F1 and F2 are reset to zero. It is determined, in step S12, whether or not the vehicle moving lane is recognized by the guide line recognizing unit 36. When the vehicle moving lane is recognized, the routine proceeds to step S14. If the vehicle moving lane is not recognized, the routine is ended.

In step S14, the offset amount e and the distances L1 and L2 which are output from the guide line recognizing unit 36 are read. In step S15, the offset amount E(n) is calculated based on the above-mentioned relationships. Then, in step S16, a rear wheel steering control amount D(n) is calculated by the following relationship, where D(n−1) is a rear wheel steering control amount from the previous time, E(n−1) is an offset amount of the vehicle from the previous time and K1 is a rear wheel control gain (constant value).

$$D(n)=D(n-1)+K1\times\{E(n)-E(n-1)\} \quad (1)$$

In step S22, it is determined whether or not the distance L1 between the guide line I and the vehicle 70 is equal to or less than a predetermined value 11. If L1 is equal to or less than the predetermined value 11 (L1≦11), the routine proceeds to step S24 in which the flag F1 is set to 1 and, then, the routine proceeds to step S30. On the other hand, if the distance L1 is greater than 11 (L1>11), the routine proceeds to step S26. In step S26, it is determined whether or not the distance L2 between the guide line II and the vehicle 70 is equal to or less than a predetermined value 12. If the distance L2 is equal to or less than the predetermined value 12 (L2≦12), the routine proceeds to step S28 in which the flag F2 is set to 1, and then the routine proceeds to step S30.

The predetermined values 11 and 12 are reference values for determining whether or not the vehicle 70 is too close to the guide line I or II. The flag F1 or F2 is set to 1 when the vehicle 70 enters a control area 72 or 74 and a rear wheel steering operation is to be performed. On the other hand, each of the flags F1 and F2 is set to zero when the rear wheel steering operation is not to be performed. The process of the above-mentioned steps S22 to S28 corresponds to the steering control starting means M3 shown in FIG. 1.

In step S30, the rear wheel steering control amount D(n) calculated in step S16 is set to a actual rear wheel steering control amount D, and the routine proceeds to step S32. In step S32, the drive circuit 40 is operated based on the actual rear wheel steering control amount D. Thereby, the electric motor 21 is driven which steers the rear wheels RW1 and RW2, and then the routine is ended.

On the other hand, if it is determined, in step S26, that the distance L2 is greater than the predetermined distance 12 (L2>12), the routine proceeds to step S34. In step S34, it is determined whether or not the flag F1 is 1 and the distance L1 is less than a predetermined value 13 or the flag F2 is 1 and the distance L2 is less than a predetermined value 14. If the condition of step 34 is satisfied, the routine proceeds to step S30 so as to perform a rear wheel steering control operation. The process of step S34 corresponds to the steering control ending means M4 shown in FIG. 1.

On the other hand, if the condition of step S34 is not satisfied, that is, if the flag F1 is equal to zero or the distance L1 is equal to or greater than the predetermined value 13, or the distance L2 is equal to or greater than 14, the routine proceeds to step S36. In step S36, each of the flags F1 and F2 is reset to so that the rear steering control operation is not performed, and then the routine is ended.

Accordingly, when the vehicle 70 approaches the guide line I and if the distance L1 is equal to or less than the predetermined value 11, the rear steering control operation is started so as to move the vehicle 70 toward the target position located in the center of the lane. Thereby, the vehicle 70 is prevented from moving to the outside of the guide line I. However, when the vehicle 70 moves away from the guide line I and the distance L1 becomes equal to or greater than the predetermined value 13 t (L1≧13), the rear steering control operation is ended.

Accordingly, if the vehicle 70 is in a dead zone 76, a steering operation of the driver does not interfere with a rear wheel steering control operation. Thus, in the dead zone, the vehicle 70 can be moved in an arbitrary position desired by the driver, resulting in an improved drivability. The same effect is provided when the vehicle 70 approaches the guide line II.

Additionally, the control is prevented from being unstable due to a repetition of start and stop of the rear steering control operation since the predetermined values 11 and 12 which are for starting the rear steering control operation are different from the predetermined values 13 and 14, respectively (13>11, 14>12), for ending the rear steering control operation.

It should be noted that in the above-mentioned embodiment, although the steering control is applied to the rear wheels, the steering control may be applied to the front wheels.

The present invention is not limited to the specifically disclosed embodiments, and variations and modifications may be made without departing from the scope of the present invention.

What is claimed is:

1. A steering control apparatus for a vehicle comprising:

guide line recognizing means for recognizing at least one guide line provided on a vehicle moving lane on which said vehicle is moving so as to set a target position on the vehicle moving lane based on a result of recognition of said guide line;

steering control means for performing a steering control operation so that said vehicle moves to trace said target position;

steering control starting means for starting the steering control operation when a distance between said vehicle and said guide line recognized by said guide line recognizing means is less than a first predetermined value; and steering control ending means for ending the steering control operation when the distance between said vehicle and said guide line recognized by said guide line recognizing means exceeds a second predetermined value which is greater than said first predetermined value.

2. The steering control apparatus as claimed in claim 1, wherein said guide line recognizing means comprising:

a camera which takes an image of a forward view of said vehicle; and a guide line recognizing unit which processes the image taken by said camera so as to recognize the guide line and set the target position, said guide line recognizing unit calculating a distance between said vehicle and the guide line and an amount of offset of a present position of said vehicle from the target position.

3. The steering control apparatus as claimed in claim 2, wherein said steering control means includes:

a steering mechanism operated by an electric motor;

steering calculating means for calculating an amount of steering to be achieved by said steering mechanism in accordance with the offset amount of said vehicle; and a drive circuit which controls said electric motor so that the amount of steering calculated by said steering calculating means is achieved.

4. A steering control apparatus for a vehicle comprising:

guide line recognizing means for recognizing a first guide line and a second guide line between which said vehicle is moving, said guide line recognizing means calculating a first distance between said vehicle and said first guide line and a second distance between said vehicle and said second guide line;

steering control starting means for starting a steering control operation when one of first and second conditions is satisfied, said first distance being equal to or less than a first predetermined value in said first condition, said second distance being equal to or less than a second predetermined value in said second condition; and steering control ending means for ending the steering control operation when one of third and fourth conditions is satisfied, said first distance being greater than a third predetermined value in said third condition, said second distance being greater than a fourth predetermined value in said fourth condition, said third predetermined value being greater than said first predetermined value and said fourth predetermined value being greater than said second predetermined value.

5. The steering control apparatus as claimed in claim 4, wherein said guide line recognizing means comprises:

a camera which takes an image of a forward view of said vehicle; and a guide line recognizing unit which processes the image taken by said camera so as to recognize the first and second guide lines and calculate said first and second distances.

* * * * *

(12) REEXAMINATION CERTIFICATE (4485th)
United States Patent
Sato et al.

(10) Number: US 6,070,112 C1
(45) Certificate Issued: Nov. 6, 2001

(54) VEHICLE STEERING CONTROL APPARATUS

(75) Inventors: Kunihito Sato, Mishima; Takeshi Goto, Toyota; Yuichi Kubota, Susono, all of (JP)

(73) Assignee: Toyota Jidosha Kabushiki Kaisha, Toyota (JP)

Reexamination Request:
No. 90/005,835, Oct. 2, 2000

Reexamination Certificate for:
Patent No.: 6,070,112
Issued: May 30, 2000
Appl. No.: 08/969,471
Filed: Nov. 13, 1997

(30) Foreign Application Priority Data

Nov. 14, 1996 (JP) ................................................ 8-303337

(51) Int. Cl.$^7$ ........................................................ B62D 6/00
(52) U.S. Cl. ............................... 701/41; 701/28; 348/118
(58) Field of Search ................................ 701/41, 28, 300, 701/301, 96; 348/118, 119; 180/168

(56) References Cited

U.S. PATENT DOCUMENTS

| | | | |
|---|---|---|---|
| 5,245,422 | 9/1993 | Borcherts et al. | 348/119 |
| 5,301,617 | 4/1994 | Miwa et al. | 180/168 |
| 5,483,453 | 1/1996 | Uemura et al. | 701/23 |
| 5,485,378 | 1/1996 | Franke et al. | 701/41 |
| 5,517,412 | 5/1996 | Unoura | 701/23 |
| 5,610,816 | 3/1997 | Kim | 701/24 |
| 5,765,116 | 6/1998 | Wilson-Jones et al. | 701/41 |

FOREIGN PATENT DOCUMENTS

| | | |
|---|---|---|
| 40 14365 A1 | 11/1990 | (DE) . |
| 43 32836 C1 | 9/1994 | (DE) . |
| 5-294250 | 11/1993 | (JP) . |
| 5-297939 | 11/1993 | (JP) . |
| 6-4799 | 1/1994 | (JP) . |
| 7-105498 | 4/1995 | (JP) . |

*Primary Examiner*—Tan Nguyen

(57) ABSTRACT

A steering control apparatus for a vehicle which prevents an interference between a steering operation performed by the steering control apparatus and a steering operation performed by a driver of the vehicle. A guide line provided on a vehicle moving lane is recognized by a forward image of the vehicle so as to set a target position on the vehicle moving lane based on a result of recognition of the guide line. A steering control operation is performed so that the vehicle moves to trace the target position. The steering control operation is started when a distance between the vehicle and the guide line is less than a first predetermined value. The steering control operation is ended when a distance between the vehicle and the guide line exceeds a second predetermined value which is greater than the first predetermined value.

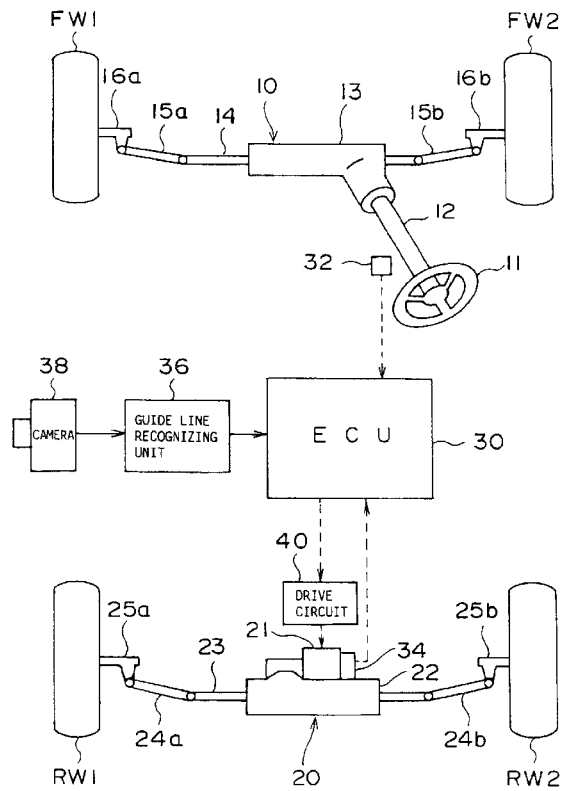

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

\* \* \* \* \*